(12) United States Patent
Katayama

(10) Patent No.: US 11,128,873 B2
(45) Date of Patent: Sep. 21, 2021

(54) STORAGE MEDIUM, ENCODING DEVICE, DECODING DEVICE, ENCODING METHOD, AND DECODING METHOD

(71) Applicant: FUJITSU LIMITED, Kawasaki (JP)

(72) Inventor: Kentaro Katayama, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/857,225

(22) Filed: Apr. 24, 2020

(65) Prior Publication Data
US 2020/0382794 A1    Dec. 3, 2020

(30) Foreign Application Priority Data

May 30, 2019 (JP) .............................. JP2019-101629

(51) Int. Cl.
*H04N 19/159* (2014.01)
*H04N 19/117* (2014.01)
*H04N 19/124* (2014.01)

(52) U.S. Cl.
CPC ......... *H04N 19/159* (2014.11); *H04N 19/117* (2014.11); *H04N 19/124* (2014.11)

(58) Field of Classification Search
CPC .. H04N 19/159; H04N 19/117; H04N 19/124; H04N 19/105; H04N 19/82; H04N 19/147; H04N 19/172
See application file for complete search history.

(56) References Cited

U.S. PATENT DOCUMENTS

2018/0184123 A1    6/2018 Terada et al.
2019/0124348 A1*   4/2019 Yang .................. G06N 20/20
(Continued)

FOREIGN PATENT DOCUMENTS

EP          3310058 A1     4/2018
JP     2013-223050 A      10/2013
(Continued)

OTHER PUBLICATIONS

Extended European Search Report dated Jul. 9, 2020 for corresponding European Patent Application No. 20172404.4, 8 pages.

*Primary Examiner* — Joseph W Becker
(74) *Attorney, Agent, or Firm* — Fujitsu Patent Center

(57) ABSTRACT

A storage medium storing a program that causes a processor to execute a process, the process includes calculating a prediction residual from a difference between a predicted image generated by intra-screen prediction or inter-screen prediction and the input image to be processed and performing orthogonal transformation processing and quantization processing on the prediction residual, and then performing entropy encoding processing, acquiring a quantization parameter used in the quantization processing, a signal including a quantization error occurring in the quantization processing, and an image including a prediction error occurring in the intra-screen prediction or the inter-screen prediction when encoding the input image to be processed, and acquiring an encoding distortion inferred by a filter unit by separately inputting the quantization parameter, the signal including the quantization error, and the image including the prediction error to the filter unit that has learned an encoding distortion generated, encoding an input image for learning.

13 Claims, 15 Drawing Sheets

(56) References Cited

U.S. PATENT DOCUMENTS

2019/0230354 A1    7/2019  Kim
2020/0213610 A1*   7/2020  Kondo .................. H04N 19/54

FOREIGN PATENT DOCUMENTS

KR      20180001428 A    1/2018
WO      2016/199330 A1  12/2016
WO      2019/072097 A1   4/2019

* cited by examiner

STORAGE MEDIUM, ENCODING DEVICE, DECODING DEVICE, ENCODING METHOD, AND DECODING METHOD

CROSS-REFERENCE TO RELATED APPLICATION

This application is based upon and claims the benefit of priority of the prior Japanese Patent Application No. 2019-101629, filed on May 30, 2019, the entire contents of which are incorporated herein by reference.

FIELD

The embodiment discussed herein is related to storage medium, an encoding device, a decoding device, an encoding method, and a decoding method.

BACKGROUND

In the versatile video coding (VVC) standard which is the next generation international standard for compression encoding of moving image data, the application of an artificial intelligence (AI) filter capable of inferring the encoding distortion included in a reference image as an in-loop filter has been studied.

For example, related art includes International Publication Pamphlet No. WO 2016/199330.

SUMMARY

According to an aspect of the embodiments, a non-transitory computer-readable storage medium storing a program that causes a processor included in a computer to execute a process, the process includes encoding an input image to be processed by calculating a prediction residual from a difference between a predicted image generated by intra-screen prediction or inter-screen prediction and the input image to be processed and performing orthogonal transformation processing and quantization processing on the calculated prediction residual, and then performing entropy encoding processing, acquiring a quantization parameter used in the quantization processing, a signal including a quantization error occurring in the quantization processing, and an image including a prediction error occurring in the intra-screen prediction or the inter-screen prediction when encoding the input image to be processed, and acquiring an encoding distortion inferred by a filter unit by separately inputting the acquired quantization parameter, the acquired signal including the quantization error, and the acquired image including the prediction error to the filter unit that has learned an encoding distortion generated when encoding an input image for learning.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The reference image processed by the in-loop filter is generated by adding a prediction residual (prediction residual obtained by performing quantization processing, inverse quantization processing, and the like on the difference between a predicted image and an input image) to a predicted image generated by intra-screen prediction or inter-screen prediction.

Therefore, in the reference image, both the "prediction error" occurring in the intra-screen prediction or inter-screen prediction and the "quantization error" occurring in the quantization processing are mixed. As a result, in the case of an AI filter that has learned by using a reference image as an input, a situation is assumed in which sufficient filter performance may not be obtained.

In one aspect, it is an object of the present disclosure to improve the filter performance of an in-loop filter.

The filter performance of the in-loop filter may be improved.

Hereinafter, respective embodiments are described with reference to the accompanying drawings. In the present specification and drawings, components having substantially the same functional configurations are assigned with the same reference signs, and duplicated description is omitted.

Embodiments

<System Configuration of Image Processing System>

Figure 1:
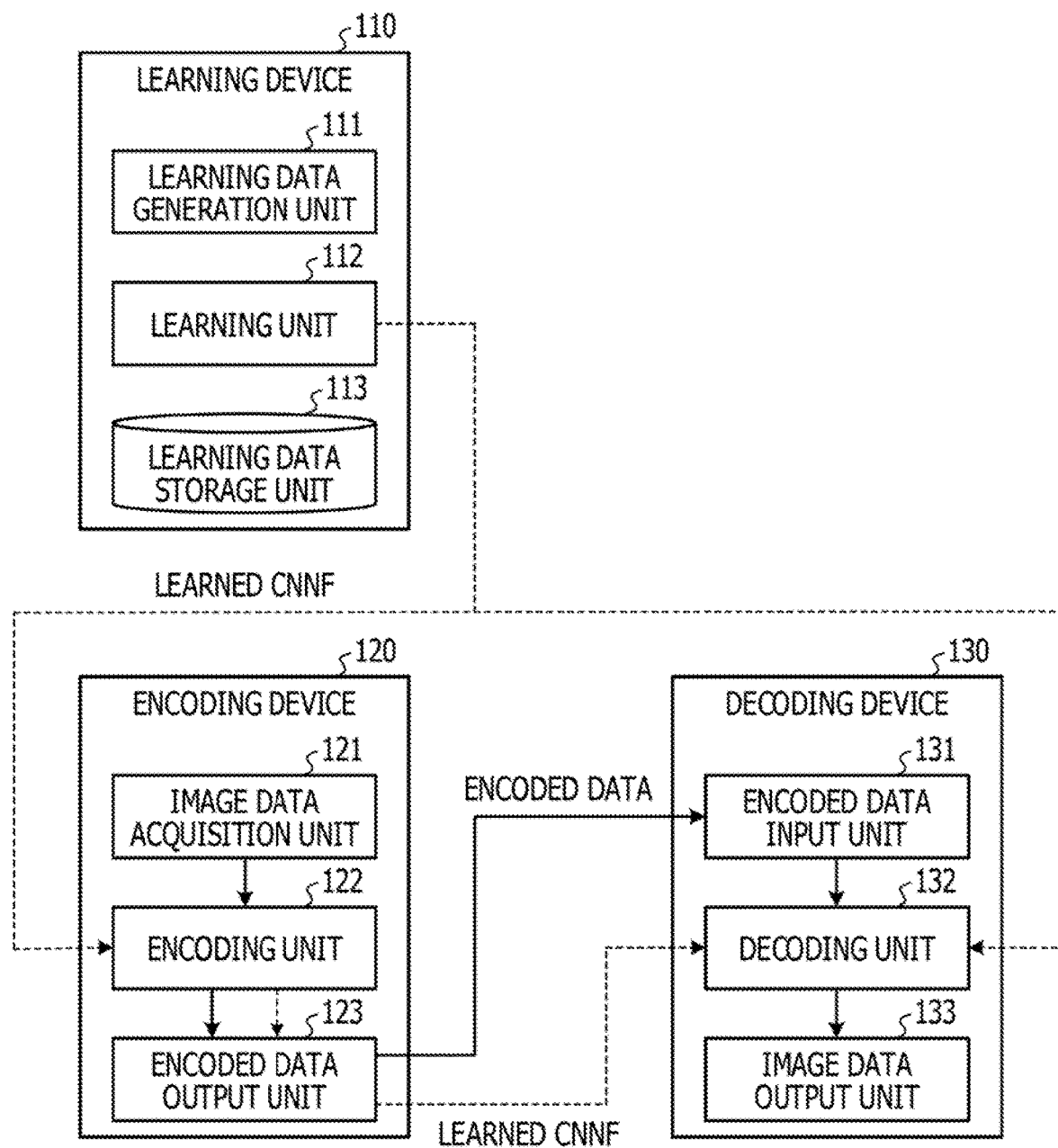
FIG. 1 is a diagram illustrating an example of a system configuration of an image processing system.

First, a system configuration of an image processing system will be described. FIG. 1 is a diagram illustrating an example of a system configuration of an image processing system. As illustrated in FIG. 1, an image processing system 100 includes a learning device 110, an encoding device 120, and a decoding device 130.

The learning device 110 is a device that generates a learned convolutional neural network filter (CNNF), which is an example of an AI filter mounted on an in-loop filter unit of the encoding device 120 and the decoding device 130.

A learning program is installed in the learning device 110, and the learning device 110 functions as a learning data generation unit 111 and a learning unit 112 by executing the program.

The learning data generation unit 111 generates learning data used for CNNF learning. The learning data generated by the learning data generation unit 111 is stored in the learning data storage unit 113.

The learning unit 112 performs learning processing on the CNNF by using the learning data stored in the learning data storage unit 113 and generates a learned CNNF. The learned CNNF generated by the learning unit 112 is transmitted to the encoding device 120 (or to the encoding device 120 and the decoding device 130).

The encoding device 120 is a device that encodes image data and generates encoded data. An encoding program is installed in the encoding device 120, and by executing the program, the encoding device 120 functions as an image data acquisition unit 121, an encoding unit 122, and an encoded data output unit 123.

The image data acquisition unit 121 acquires image data to be encoded. The encoding unit 122 encodes the image data acquired by the image data acquisition unit 121 and generates encoded data. The encoding unit 122 uses the learned CNNF when generating encoded data.

The encoded data output unit 123 transmits the encoded data generated by the encoding unit 122 to the decoding device 130. When transmitting the encoded data, the encoded data output unit 123 also transmits a quantization parameter. When transmitting the encoded data and the quantization parameter, the encoded data output unit 123 may transmit the learned CNNF used for generating the encoded data.

The decoding device 130 is a device that receives encoded data and decodes the received encoded data to output image data. A decoding program is installed in the decoding device 130, and the decoding device 130 functions as an encoded data input unit 131, a decoding unit 132, and an image data output unit 133 by executing the program.

The encoded data input unit 131 receives the encoded data and the quantization parameter from the encoding device 120. The decoding unit 132 decodes the encoded data received from the encoding device 120 and generates image data. When decoding the encoded data, the decoding unit 132 uses the quantization parameter received from the encoding device 120 and the learned CNNF transmitted from the learning device 110 (or the encoding device 120). The image data output unit 133 outputs the image data generated by the decoding unit 132.

<Hardware Configuration of Each Device>

Next, a hardware configuration of each of the learning device 110, the encoding device 120, and the decoding device 130 will be described. In the present embodiment, it is assumed that each of the learning device 110, the encoding device 120, and the decoding device 130 has the same hardware configuration.

Figure 2:
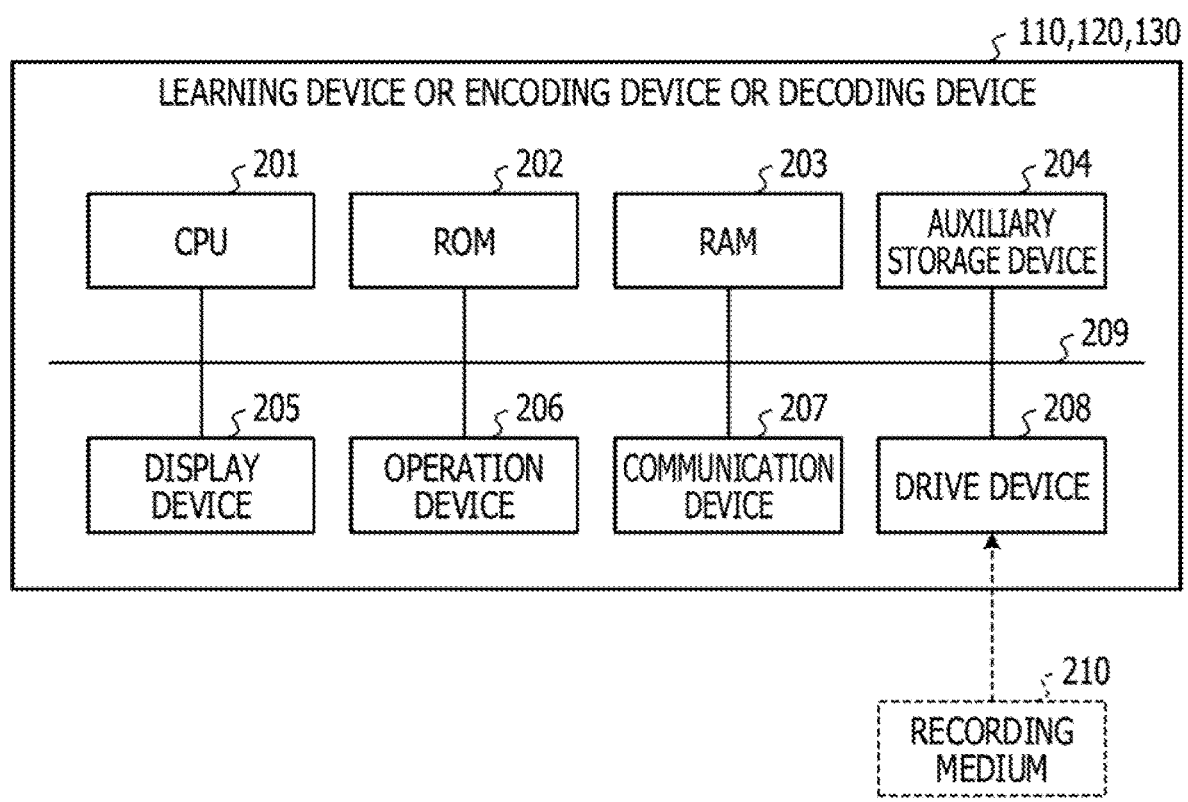
FIG. 2 is a diagram illustrating an example of a hardware configuration of a learning device, an encoding device, and a decoding device.

FIG. 2 is a diagram illustrating an example of a hardware configuration of a learning device, an encoding device, and a decoding device. As illustrated in FIG. 2, each device includes a central processing unit (CPU) 201, a read-only memory (ROM) 202, and a random-access memory (RAM) 203. The CPU 201, the ROM 202, and the RAM 203 form a so-called computer.

Each device includes an auxiliary storage device 204, a display device 205, an operation device 206, a communication device 207, and a drive device 208. Each hardware in each device is mutually coupled via a bus 209.

The CPU 201 is an arithmetic device that executes various programs (for example, a learning program, an encoding program, a decoding program, or the like) installed in the auxiliary storage device 204.

The ROM 202 is a nonvolatile memory. The ROM 202 functions as a main storage device that stores various programs, data, and the like for the CPU 201 to execute various programs installed in the auxiliary storage device 204. For example, the ROM 202 functions as a main storage device that stores a boot program such as a Basic Input/Output System (BIOS), an Extensible Firmware Interface (EFI), and the like.

The RAM 203 is a volatile memory such as a dynamic random-access memory (DRAM), a static random-access memory (SRAM), or the like. The RAM 203 functions as a main storage device that provides a work area that is developed when various programs installed in the auxiliary storage device 204 are executed by the CPU 201.

The auxiliary storage device 204 is an auxiliary storage device that stores various programs and data. For example, the learning data storage unit 113 is realized in the auxiliary storage device 204. The display device 205 is a display device that displays the internal state of each device. The operation device 206 is an input device for a user of each device to input various instructions to each device. The communication device 207 is a communication device for each device to transmit and receive information to and from another device.

The drive device 208 is a device for setting a computer-readable recording medium. The recording medium includes a medium for optically, electrically, or magnetically recording information, such as a CD-ROM, a flexible disk, and a magneto-optical disk. Alternatively, the recording medium may include a semiconductor memory and the like for electrically recording information, such as a ROM, a flash memory, or the like.

Various programs to be installed in the auxiliary storage device 204 may be installed, for example, by setting a distributed recording medium in the drive device 208 and reading various programs recorded on the recording medium by the drive device 208.

<Details of Learning Device>

Next, details of the learning device 110 will be described.

Figure 3:
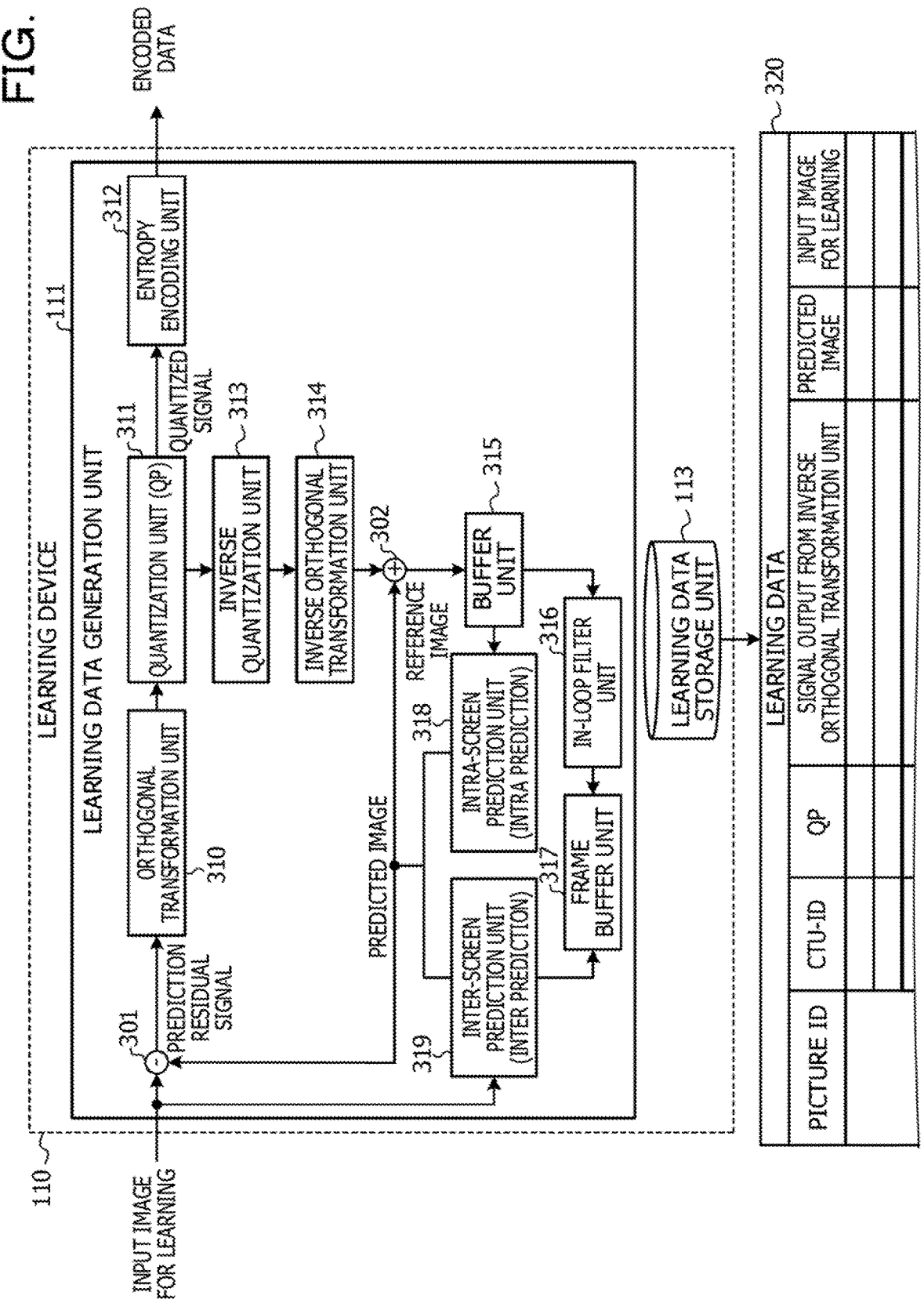
FIG. 3 is a diagram illustrating a functional configuration of a learning data generation unit in the learning device and an example of generated learning data.

(1) Description of Functional Configuration of Learning Data Generation Unit in Learning Device and Learning Data First, a functional configuration of the learning data generation unit 111 in the learning device and details of the learning data generated by the learning data generation unit 111 will be described. FIG. 3 is a diagram illustrating a functional configuration of a learning data generation unit in the learning device and an example of generated learning data.

As illustrated in FIG. 3, the learning data generation unit 111 includes a difference unit 301, an orthogonal transformation unit 310, a quantization unit 311, an entropy encoding unit 312, an inverse quantization unit 313, and an inverse orthogonal transformation unit 314. The learning data generation unit 111 includes an addition unit 302, a buffer unit 315, an in-loop filter unit 316, a frame buffer unit 317, an intra-screen prediction unit 318, and an inter-screen prediction unit 319.

The difference unit 301 calculates a difference between an input image for learning and a predicted image and outputs a prediction residual signal.

The orthogonal transformation unit 310 performs orthogonal transformation processing on the prediction residual signal output by the difference unit 301.

The quantization unit 311 quantizes the prediction residual signal that has been subjected to the orthogonal transformation processing and generates a quantized signal.

The entropy encoding unit 312 generates encoded data by performing entropy encoding processing on the quantized signal.

The inverse quantization unit 313 inversely quantizes the quantized signal. The inverse orthogonal transformation unit 314 performs inverse orthogonal transformation processing on the inversely quantized signal.

The addition unit 302 generates a reference image by adding the signal output from the inverse orthogonal transformation unit 314 and the predicted image. The buffer unit 315 stores the reference image generated by the addition unit 302.

The in-loop filter unit 316 performs filtering processing on the reference image stored in the buffer unit 315. The in-loop filter unit 316 includes •a deblocking filter (DB), •a sample adaptive offset filter (SAO), and •an adaptive loop filter (ALF).

The frame buffer unit 317 stores the reference image on which the filtering processing has been performed by the in-loop filter unit 316 in frame units.

The intra-screen prediction unit 318 performs intra-screen prediction based on the reference image to generate a predicted image. The inter-screen prediction unit 319 performs motion compensation between frames by using the input image for learning and the reference image to generate a predicted image.

The predicted image generated by the intra-screen prediction unit 318 or the inter-screen prediction unit 319 is output to the difference unit 301 and the addition unit 302.

The learning data generation unit 111 obtains data output from each unit when encoding an input image for learning and generates encoded data, and data used for processing in each unit and stores the data in the learning data storage unit 113 in association with the input image for learning.

Learning data 320 illustrates an example of the learning data stored in the learning data storage unit 113. As illustrated in FIG. 3, the learning data 320 includes, as information items, "picture ID", "CTU-ID", "QP", "signal output from inverse orthogonal transformation unit", "predicted image", and "input image for learning".

The "picture ID" stores an identifier for identifying each frame of the input image for learning. The "CTU-ID" stores an identifier for identifying a processing unit (CTU) when processing each frame.

The "QP" stores a quantization parameter (QP) used when the quantization unit 311 generates a quantized signal for a processing unit (CTU) to be processed.

The "signal output from the inverse orthogonal transformation unit" stores a signal output by performing inverse orthogonal transformation processing on a processing unit (CTU) to be processed by the inverse orthogonal transformation unit 314.

The "input image for learning" stores an input image for learning.

(2) Description of Functional Configuration of Learning Unit in Learning Device

Figure 4:
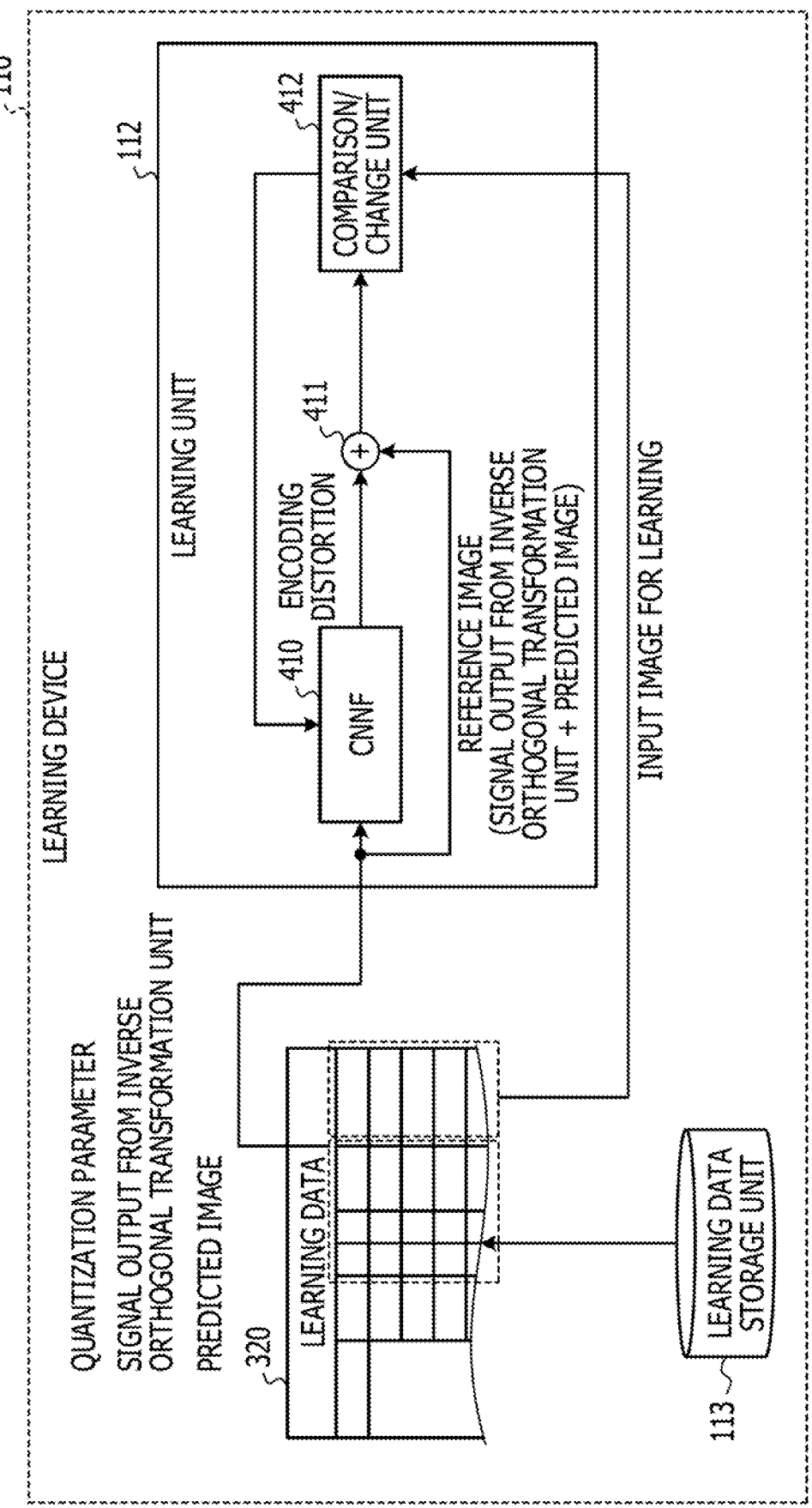
FIG. 4 is a diagram illustrating an example of a functional configuration of a learning unit in the learning device.

Next, a functional configuration of the learning unit 112 in the learning device will be described. FIG. 4 is a diagram illustrating an example of a functional configuration of a learning unit in the learning device. As illustrated in FIG. 4, the learning unit 112 includes a CNNF 410, an addition unit 411, and a comparison/change unit 412.

The learning unit 112 reads the learning data 320 from the learning data storage unit 113. The learning unit 112 executes the CNNF 410 by inputting the "QP", the "signal output from the inverse orthogonal transformation unit", and the "predicted image" associated with a predetermined picture ID and a predetermined CTU-ID to the CNNF 410.

The addition unit 411 adds the output result output from the CNNF 410, and the "signal output from the inverse orthogonal transformation unit" and the "predicted image" input to the CNNF 410 and inputs the addition result to the comparison/change unit 412. A reference image is generated by adding the "signal output from the inverse orthogonal transformation unit" and the "predicted image". For example, the addition unit 411 adds the output result output from the CNNF 410 and the reference image and inputs the addition result to the comparison/change unit 412.

The comparison/change unit 412 compares the addition result output from the addition unit 411 with the "input image for learning" of the learning data 320 that is associated with the predetermined picture ID and the predetermined CTU-ID to calculate an error. The comparison/change unit 412 updates the model parameters of the CNNF 410 by back-propagating the calculated error. As described above, the learning unit 112 performs learning on the CNNF 410 such that the addition result obtained by adding the output result output from the CNNF 410 and the reference image approaches the input image for learning.

The learning unit 112 performs learning on the CNNF 410 by performing the same processing for a plurality of picture IDs and a plurality of CTU-IDs stored in the learning data 320 of the learning data storage unit 113.

Accordingly, when the input image for learning is encoded, the learning unit 112 learns the correspondence between •the quantization parameter, the signal output from •the inverse orthogonal transformation unit, •the predicted image, and a difference between •the reference image and the input image for learning to generate a learned CNNF.

The difference between the reference image and the input image for learning is nothing less than an "encoding distortion" when the input image for learning is encoded. For example, the output result output from the CNNF 410 is nothing but encoding distortion, and the learned CNNF infers the encoding distortion by using the quantization parameter, the signal output from the inverse orthogonal transformation unit, and the predicted image as inputs.

(3) Flow of Learning Processing by Learning Device

Figure 5:
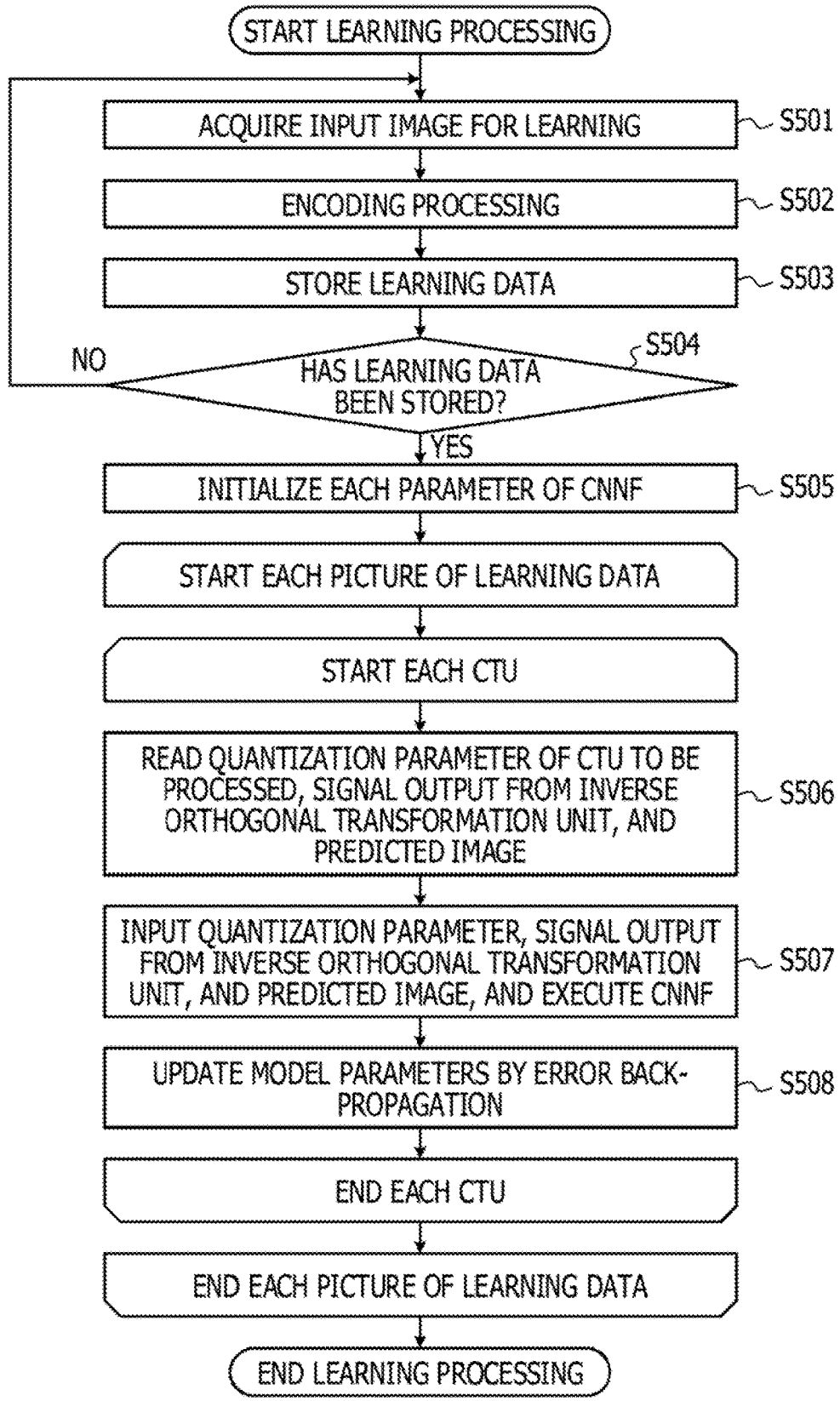
FIG. 5 is a flowchart illustrating a flow of learning processing performed by the learning device.

Next, a flow of learning processing performed by the learning device 110 will be described. FIG. 5 is a flowchart illustrating a flow of learning processing performed by the learning device.

In step S501, the learning data generation unit 111 acquires an input image for learning. In step S502, the learning data generation unit 111 performs encoding processing of encoding the acquired input image for learning to generate encoded data.

In step S503, the learning data generation unit 111 stores the learning data acquired when generating the encoded data.

In step S504, the learning data generation unit 111 determines whether or not a predetermined amount of learning data has been stored. When it is determined in step S504 that the predetermined amount of learning data is not stored (in the case of No in step S504), the process returns to step S501. On the other hand, when it is determined in step S504 that the predetermined amount of learning data has been stored (in the case of Yes in step S504), the process proceeds to step S505.

In step S505, the learning unit 112 initializes each model parameter of the CNNF 410.

Subsequently, the processing from step S506 to step S508 is executed for the picture (frame) of each picture ID of the learning data and the CTU (processing unit) of each CTU-ID to be processed.

In step S506, the learning unit 112 reads "QP", "signal output from the inverse orthogonal transformation unit", and "predicted image" associated with the CTU-ID to be processed from the learning data.

In step S507, the learning unit 112 causes the CNNF 410 to execute by inputting the "QP", the "signal output from the inverse orthogonal transformation unit", and the "predicted image" to the CNNF 410. The addition unit 411 adds the output result output from CNNF 410 and the reference image and inputs the addition result to the comparison/change unit 412.

In step S508, the comparison/change unit 412 compares the addition result of the addition unit 411 with the "input image for learning" to calculate an error. The comparison/change unit 412 updates the model parameters of the CNNF 410 by back-propagating the calculated error.

When the processing from step S506 to step S508 is completed for the pictures (frames) of all picture IDs of the learning data and the CTUs (processing units) of all CTU-IDs as processing targets, the learning unit 112 ends the learning processing.

<Description of Encoding Device>

Next, details of the encoding device 120 will be described.

(1) Description of Functional Configuration of Encoding Unit in Encoding Device

Figure 6:
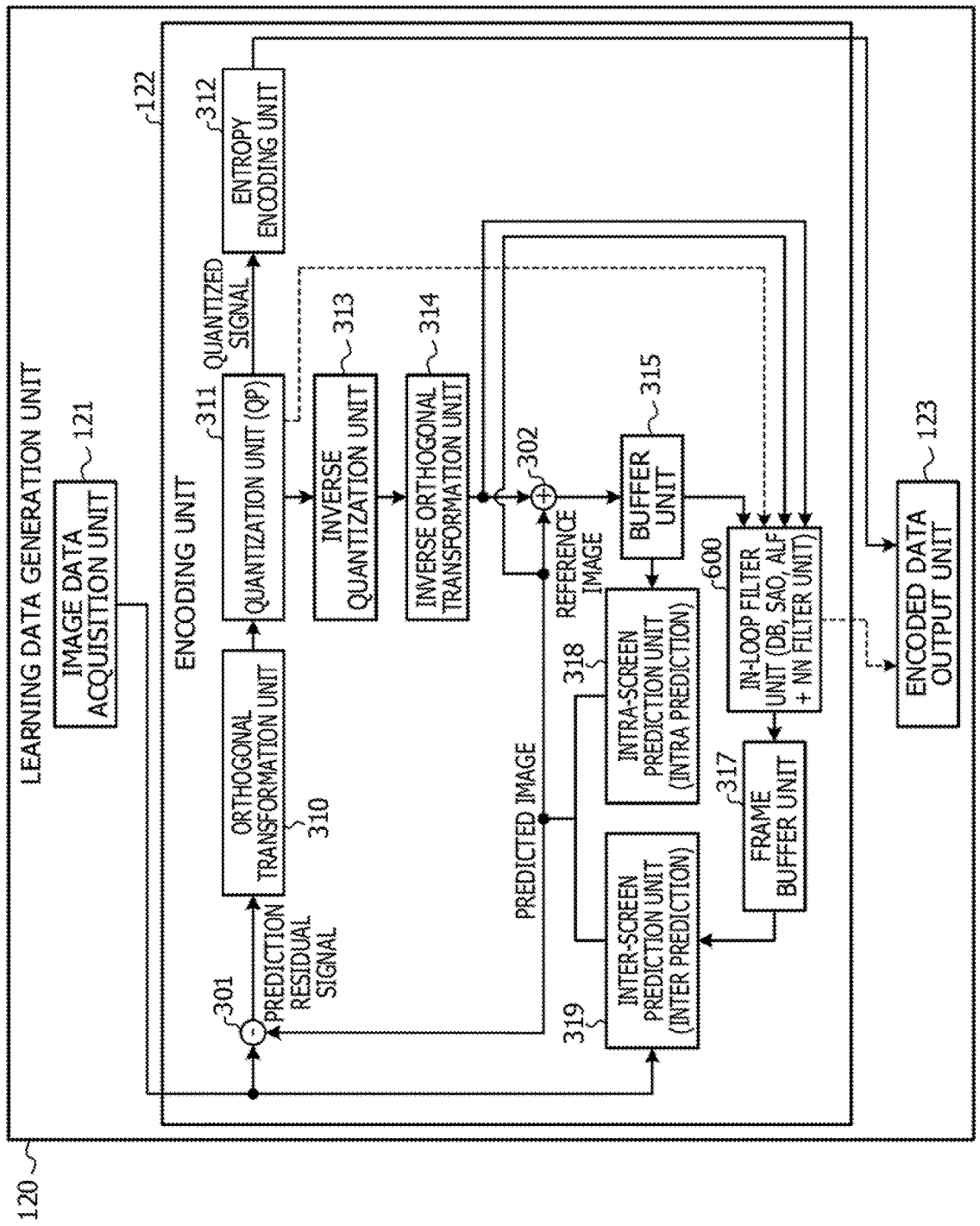
FIG. 6 is a diagram illustrating an example of a functional configuration of an encoding unit in the encoding device.

First, details of the functional configuration of the encoding unit 122 in the encoding device 120 will be described. FIG. 6 is a diagram illustrating an example of a functional configuration of an encoding unit in the encoding device.

As illustrated in FIG. 6, the functional configuration of the encoding unit 122 in the encoding device 120 is substantially the same as the functional configuration of the learning data generation unit 111 in the learning device 110 described with reference to FIG. 3. The difference from the functional configuration of the learning data generation unit 111 in the learning device 110 is the in-loop filter unit 600. The following describes the in-loop filter unit 600.

The in-loop filter unit 600 performs filtering processing on the reference image stored in the buffer unit 315. The in-loop filter unit 600 includes •a deblocking filter (DB), •a sample adaptive offset filter (SAO), •an adaptive loop filter (ALF), and •an NN filter unit.

Among the filters, the deblocking filter, the sample adaptive offset filter, and the adaptive loop filter perform filtering processing on the reference image stored in the buffer unit 315 to output a filtered reference image.

On the other hand, the NN filter unit includes the learned CNNF. The learned CNNF infers an encoding distortion by inputting the quantization parameter, the signal output from the inverse orthogonal transformation unit, and the predicted image.

The NN filter unit outputs the filtered reference image by adding the encoding distortion inferred by the learned CNNF to the reference image stored in the buffer unit 315.

Figure 7:
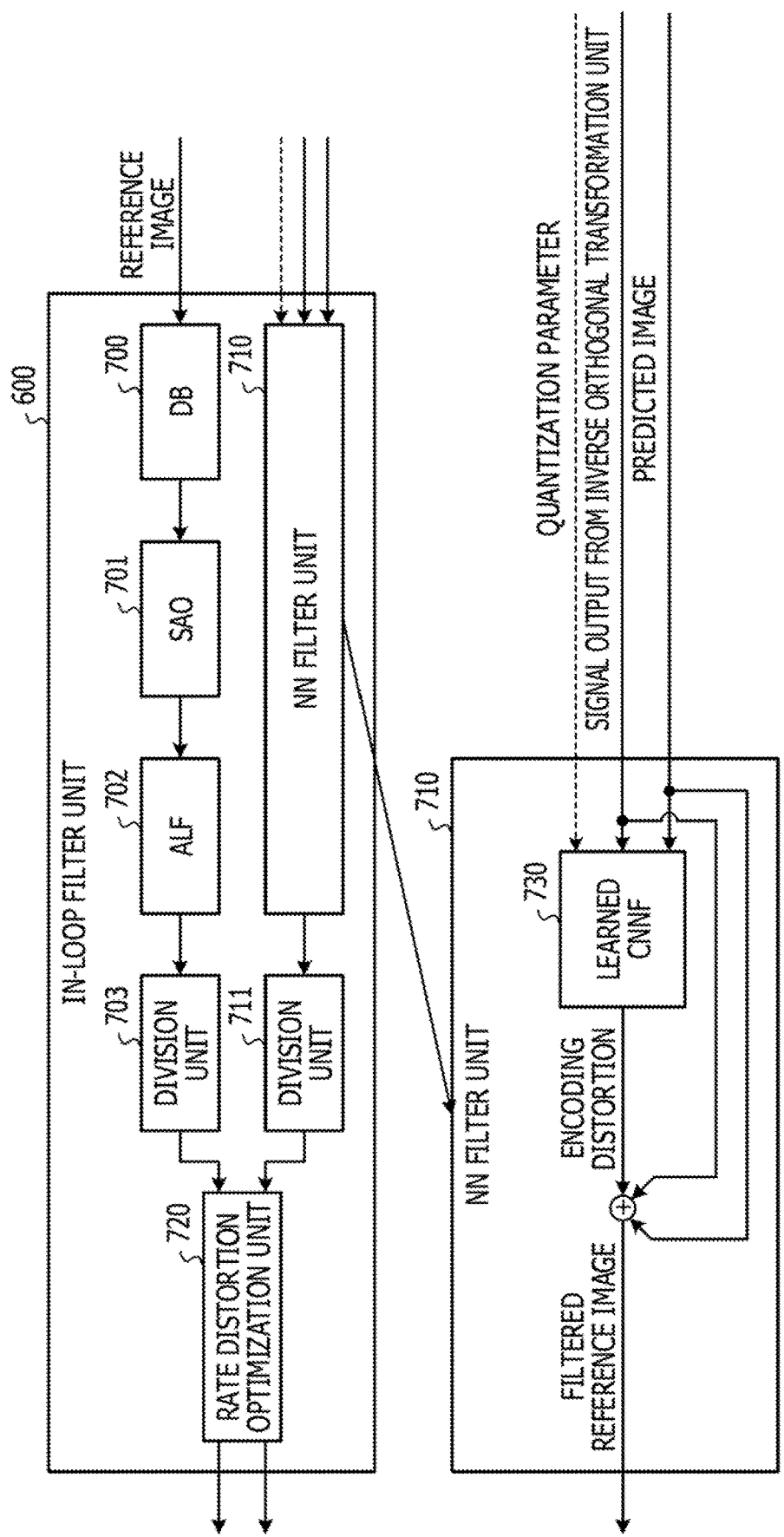
FIG. 7 is a diagram illustrating an example of a functional configuration of an in-loop filter unit and a functional configuration of an NN filter unit in the encoding device.

(2) Functional Configuration of In-Loop Filter Unit and Functional Configuration of NN Filter Unit in Encoding Device Next, details of the functional configuration of the in-loop filter unit 600 and the functional configuration of the NN filter unit in the encoding device 120 will be described. FIG. 7 is a diagram illustrating an example of a functional configuration of an in-loop filter unit and a functional configuration of an NN filter unit in the encoding device;

As illustrated in FIG. 7, the in-loop filter unit 600 includes a DB 700, an SAO 701, an ALF 702, a division unit 703, an NN filter unit 710, a division unit 711, and a rate distortion optimization unit 720.

Among the filters, the deblocking filter (DB) 700 performs filtering processing on the reference image to reduce the distortion generated at a block boundary of each CTU when the input image is encoded.

The sample adaptive offset filter (SAO) 701 classifies the reference image filtered by the DB 700 in pixel units and adds an offset value corresponding to the classification to each pixel.

The adaptive loop filter (ALF) 702 performs filtering processing on the reference image to which the offset value has been added by the SAO 701 to reduce an error from a corresponding input image.

The division unit 703 divides the filtered reference image filtered by the ALF 702 into blocks of a predetermined size (for example, 64 pixels×64 pixels).

The NN filter unit 710 is an example of a first and a second acquisition unit, and includes a learned CNNF. The NN filter unit 710 acquires a quantization parameter from the quantization unit 311. The NN filter unit 710 acquires the signal output from inverse orthogonal transformation unit 314. The NN filter unit 710 obtains the predicted image output from the intra-screen prediction unit 318 or the inter-screen prediction unit 319.

The NN filter unit 710 executes the learned CNNF by dividing and inputting the acquired quantization parameter, the signal output from the inverse orthogonal transformation unit 314, and the predicted image to the learned CNNF 730. Thereby, in the learned CNNF, an encoding distortion is inferred.

The NN filter unit 710 adds the encoding distortion inferred by the learned CNNF to a reference image (a reference image obtained by adding a signal output from the inverse orthogonal transformation unit 314 and a predicted image). Thereby, the NN filter unit 710 outputs the filtered reference image.

The division unit 711 divides the filtered reference image output from the NN filter unit 710 into blocks of a predetermined size (for example, 64 pixels×64 pixels).

The rate distortion optimization unit 720 calculates the rate distortion of the block divided by the division unit 703 and the rate distortion of the block divided by the division unit 711, respectively. The rate distortion optimization unit 720 outputs the block with a smaller rate distortion as a final filtered reference image by the in-loop filter unit 600.

(3) Flow of Filtering Processing by NN Filter Unit in Encoding Device

Figure 8:
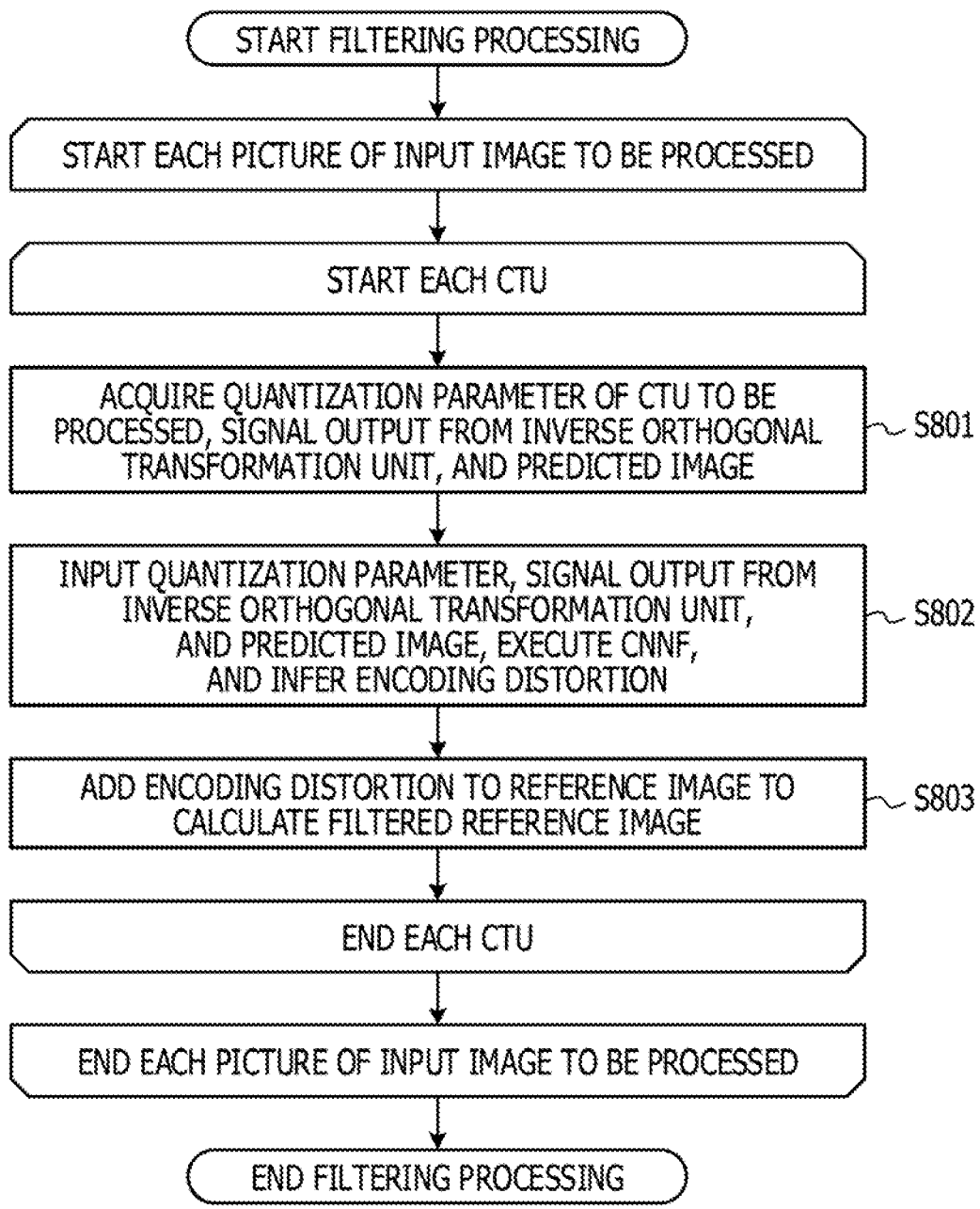
FIG. 8 is a flowchart illustrating a flow of filtering processing by the NN filter unit in the encoding device.

Next, a flow of the filtering processing by the NN filter unit 710 in the encoding device 120 will be described. FIG. 8 is a flowchart illustrating a flow of filtering processing by the NN filter unit in the encoding device.

The processing from step S801 to step S803 is executed for each picture (each frame) of the input image to be processed and each CTU (each processing unit).

In step S801, the NN filter unit 710 obtains a quantization parameter of a CTU to be processed, a signal output from the inverse orthogonal transformation unit, and a predicted image.

In step S802, the NN filter unit 710 executes the learned CNNF 730 by dividing and inputting the quantization parameter, the signal output from the inverse orthogonal transformation unit, and the predicted image to the learned CNNF 730. The NN filter unit 710 acquires the encoding distortion inferred by the learned CNNF 730.

In step S803, the NN filter unit 710 calculates the filtered reference image by adding the obtained encoding distortion to the reference image.

When the processing from step S801 to step S803 is completed for all pictures (frames) included in the input image to be processed and all CTUs (processing units), the NN filter unit 710 ends the filtering processing.

<Comparison with Encoding Device of Comparative Example>

Next, the features of the encoding device 120 are clarified by comparing the functional configuration of the encoding unit 122 in the encoding device 120 with the functional configuration of the encoding device of a comparative example. The encoding device of the comparative example refers to an encoding device to which an AI filter (an AI filter that has been learned by using a reference image as an input) that infers the encoding distortion included in a reference image is applied as an in-loop filter unit.

(1) Functional Configuration of Encoding Device of Comparative Example

Figure 9:
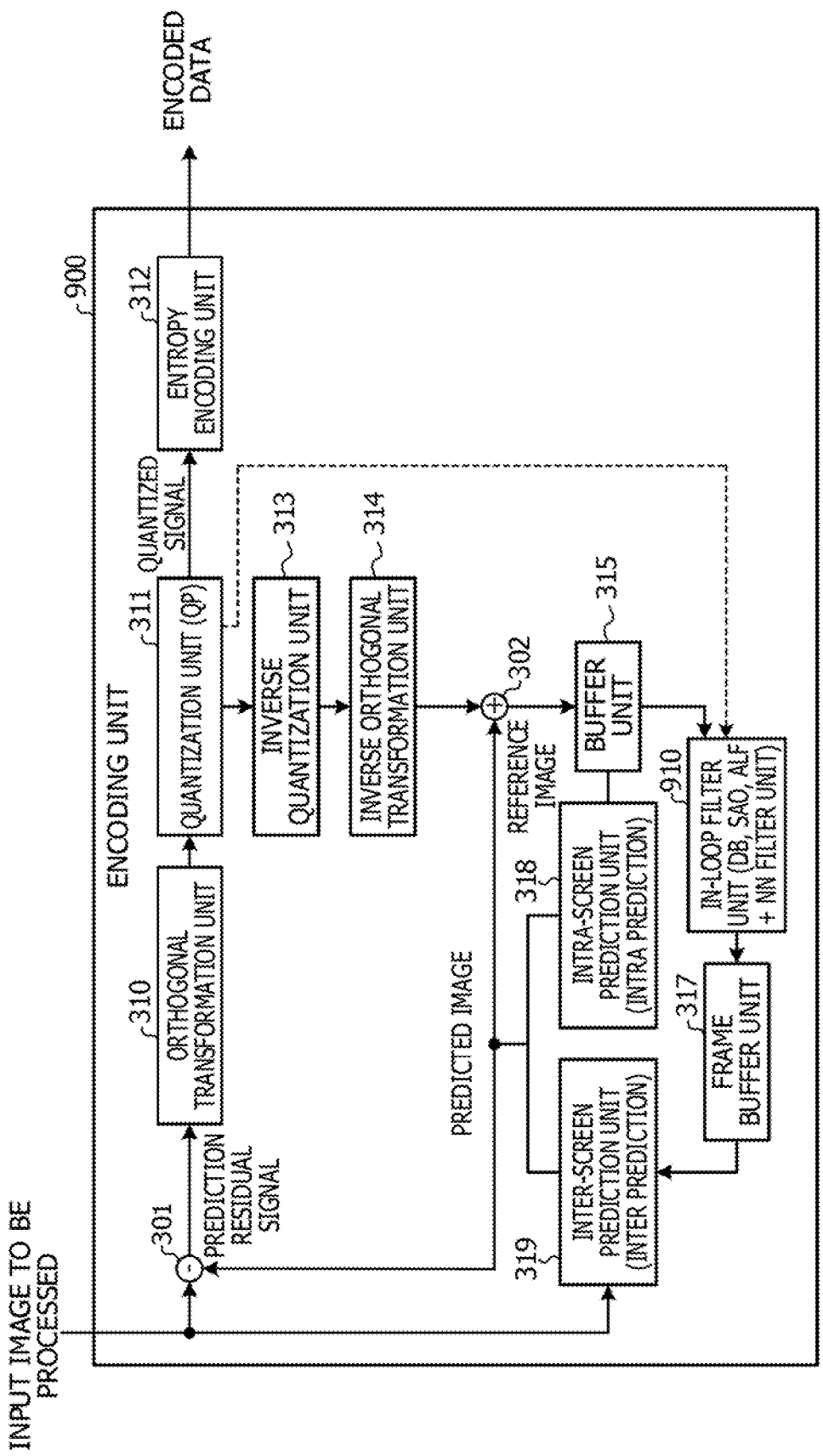
FIG. 9 is a diagram illustrating an example of a functional configuration of an encoding unit in an encoding device of a comparative example.

FIG. 9 is a diagram illustrating an example of a functional configuration of an encoding unit in an encoding device of a comparative example. In the case of the encoding unit 900 in the encoding device of the comparative example, the NN filter unit included in the in-loop filter unit 910 includes the learned CNNF generated by learning the correspondence between the quantization parameter, the reference image, and the encoding distortion.

Therefore, the reference image stored in the buffer unit 315 is input to the NN filter unit, similarly to the deblocking filter, the sample adaptive offset filter, and the adaptive loop filter.

However, in the case of the NN filter unit, the quantization parameter is further input and the learned CNNF is executed. The NN filter unit outputs the filtered reference image by adding the encoding distortion inferred by the learned CNNF to the reference image.

Figure 10:
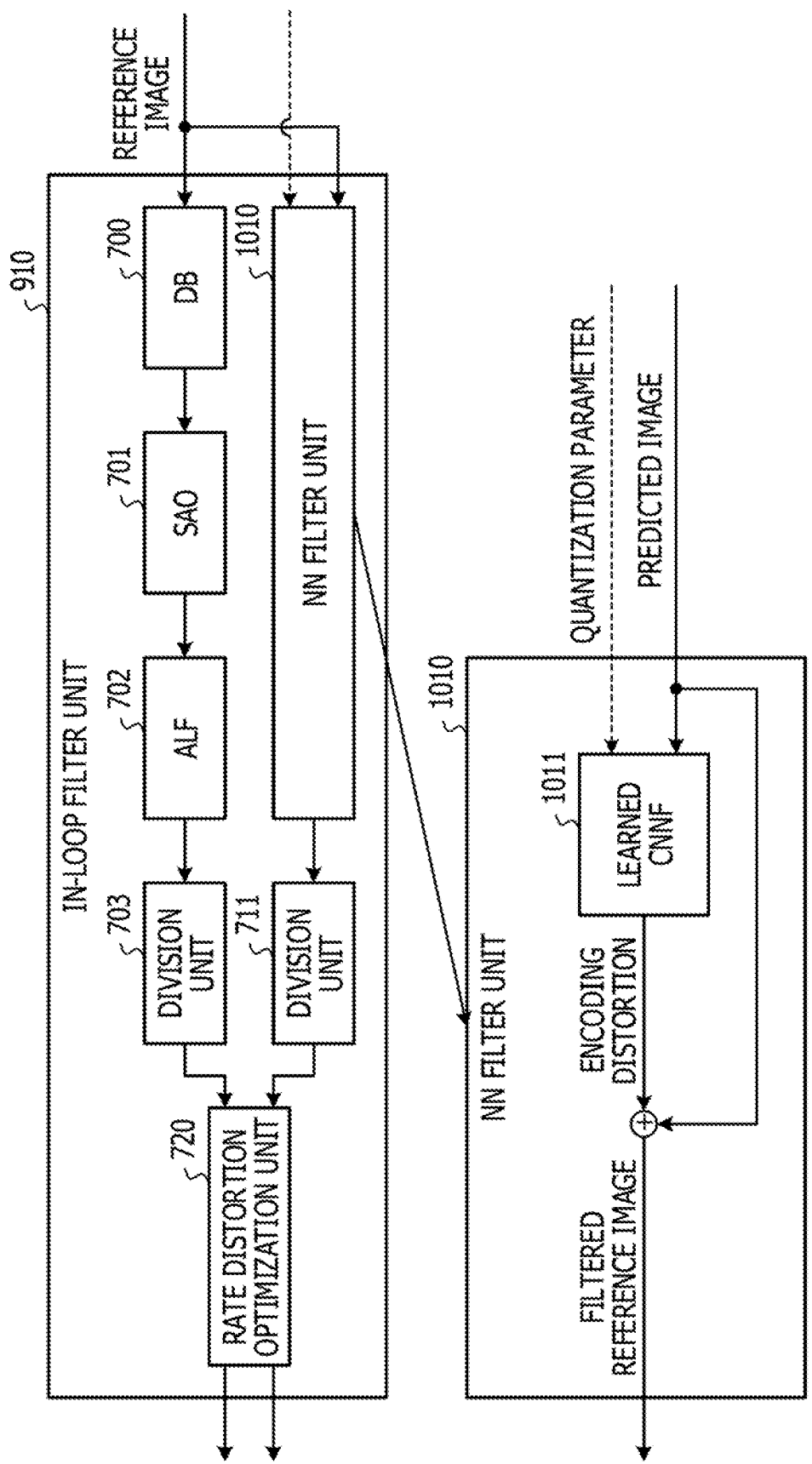
FIG. 10 is a diagram illustrating an example of a functional configuration of an in-loop filter unit and a functional configuration of an NN filter unit in the encoding device of the comparative example.

(2) Functional Configuration of In-Loop Filter Unit and Functional Configuration of NN Filter Unit in Encoding Device of Comparative Example Next, details of the functional configuration of the in-loop filter unit 910 and the functional configuration of the NN filter unit in the encoding device of the comparative example will be described. FIG. 10 is a diagram illustrating an example of a functional configuration of an in-loop filter unit and a functional configuration of an NN filter unit in the encoding device of the comparative example.

The difference from the in-loop filter unit 600 of the encoding device 120 illustrated in FIG. 7 is that, in the case of FIG. 10, the reference image and the quantization parameter are input to the NN filter unit 1010, and the learned CNNF 1011 infers encoding distortion.

(3) Differences in Effect Due to Differences in Functional Configuration

Figure 11:
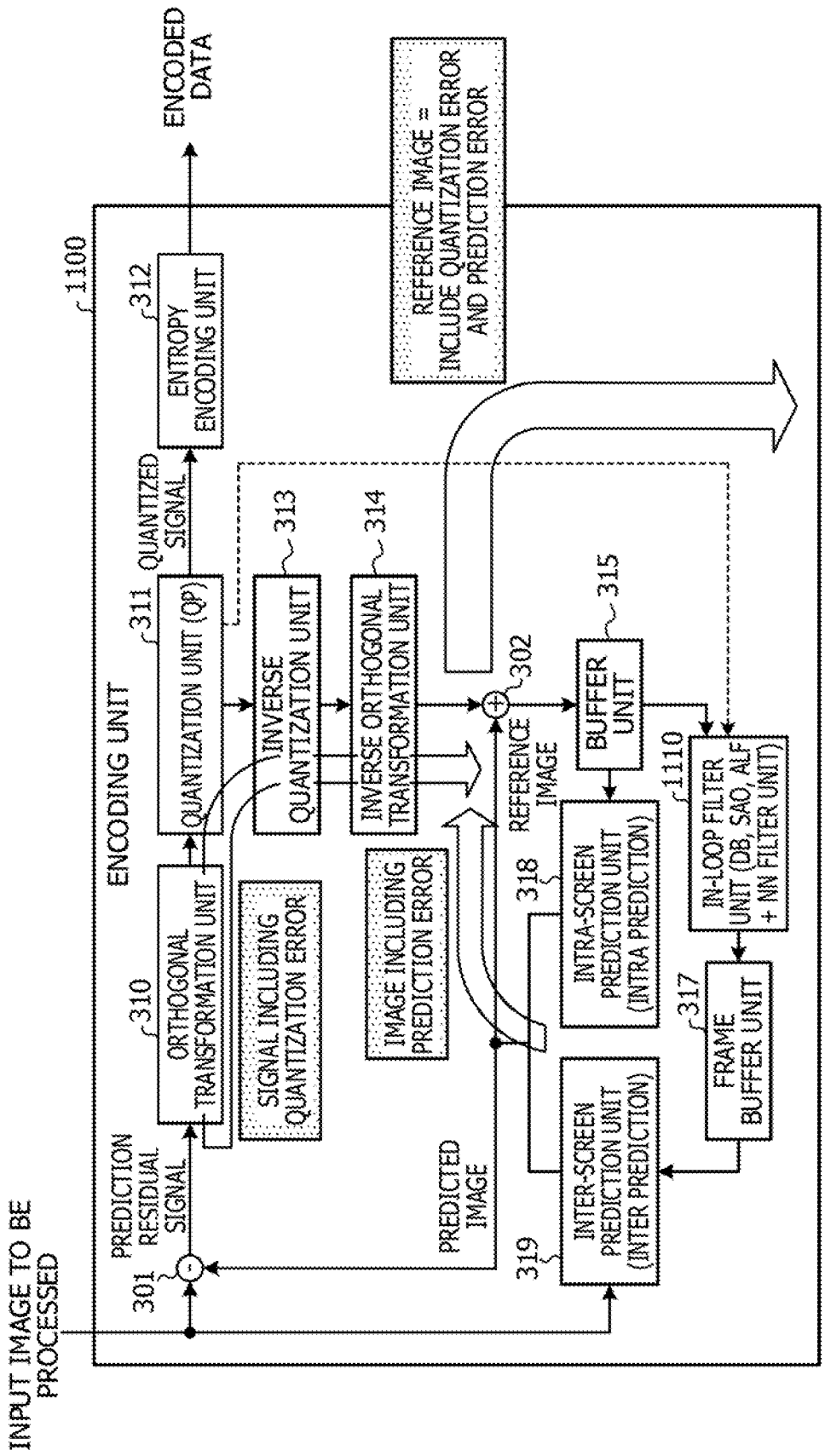
FIG. 11 is a diagram illustrating a quantization error and a prediction error in the encoding device of the comparative example.

Next, differences in effects due to differences in the functional configuration between the encoding device 120 and the encoding device of the comparative example will be described by using FIGS. 11 and 12. FIG. 11 is a diagram illustrating a quantization error and a prediction error in the encoding device of the comparative example.

As described above, in the case of the encoding device of the comparative example, the reference image and the quantization parameter are input to the learned CNNF 1011 to infer encoding distortion. As illustrated in FIG. 11, the reference image is generated by adding the signal output from the inverse orthogonal transformation unit 314 and the predicted image.

The signal output from the inverse orthogonal transformation unit 314 is obtained by performing orthogonal transformation processing and quantization processing on the prediction residual signal, and then performing inverse quantization processing and inverse orthogonal transformation processing. For this reason, the signal output from the inverse orthogonal transformation unit 314 includes a quantization error when performing the quantization processing.

On the other hand, the predicted image is an image obtained by performing the intra-screen prediction processing or the inter-screen prediction processing, and includes a prediction error.

For example, the reference image obtained by adding the signal output from the inverse orthogonal transformation unit 314 and the predicted image is nothing but an image obtained by adding a signal including a quantization error and an image including a prediction error, and both the quantization error and the prediction error are mixed in the reference image.

For this reason, depending on the input image for learning, when generating the learned CNNF 1011, a situation may occur in which the learning processing does not converge. Depending on the input image to be processed, a situation may occur in which the inference accuracy of the encoding distortion inferred by the learned CNNF 1011 is low and sufficient filter performance may not be obtained.

Figure 12:
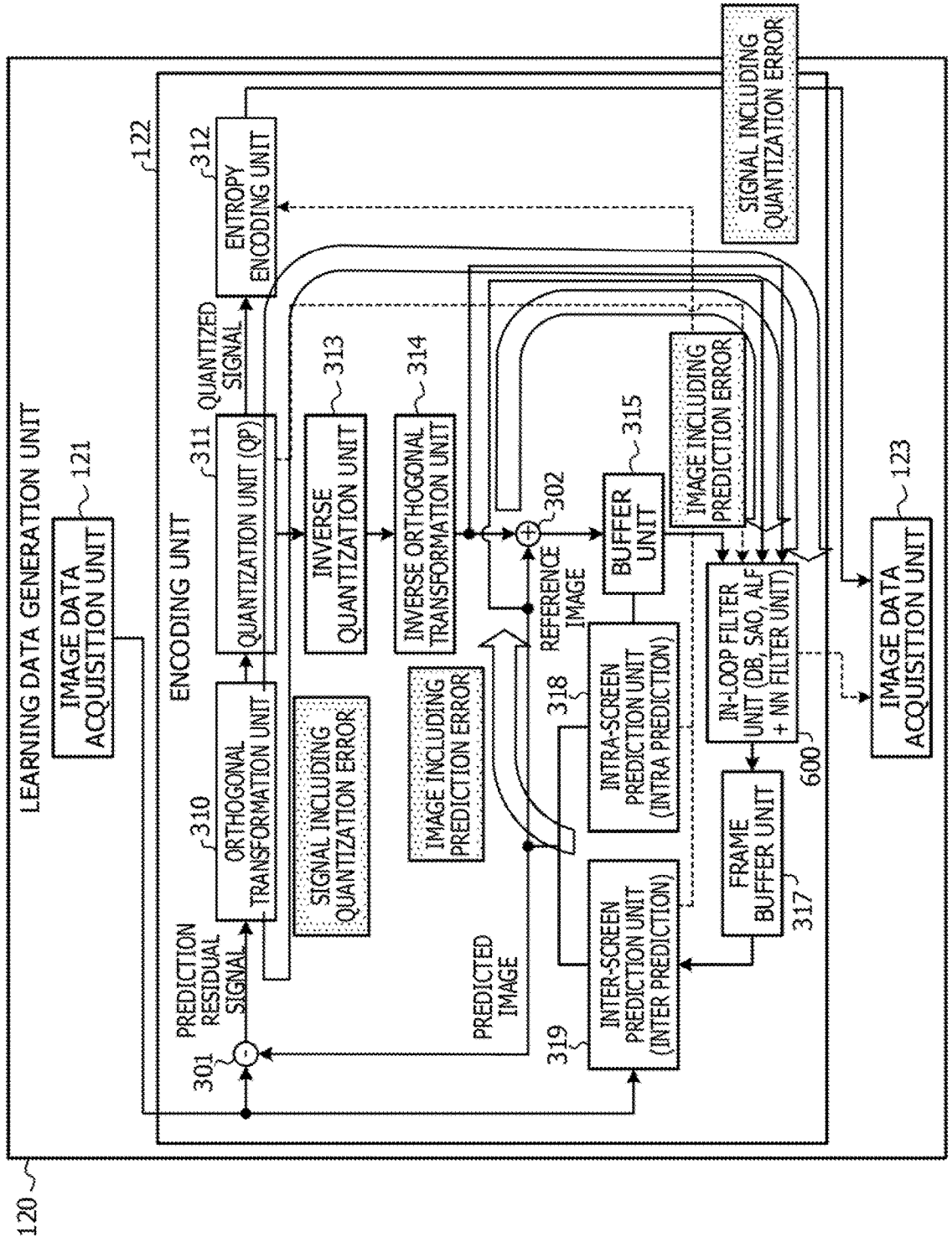
FIG. 12 is a diagram illustrating a quantization error and a prediction error in the encoding device.

FIG. 12 is a diagram illustrating a quantization error and a prediction error in the encoding device. As described above, the learned CNNF 730 included in the encoding device 120 is generated by separately inputting a signal including a quantization error and an image including a prediction error at the time of learning processing. Therefore, it is possible to avoid a situation in which the learning processing does not converge regardless of the input image for learning.

The learned CNNF 730 included in the encoding device 120 inputs a signal including a quantization error and an image including a prediction error separately at the time of inference. For this reason, an encoding distortion may be inferred with high inference accuracy regardless of the input image to be processed, and filter performance may be improved.

<Description of Decoding Device>

Next, details of the decoding device 130 will be described.

(1) Description of Functional Configuration of Decoding Unit in Decoding Device

Figure 13:
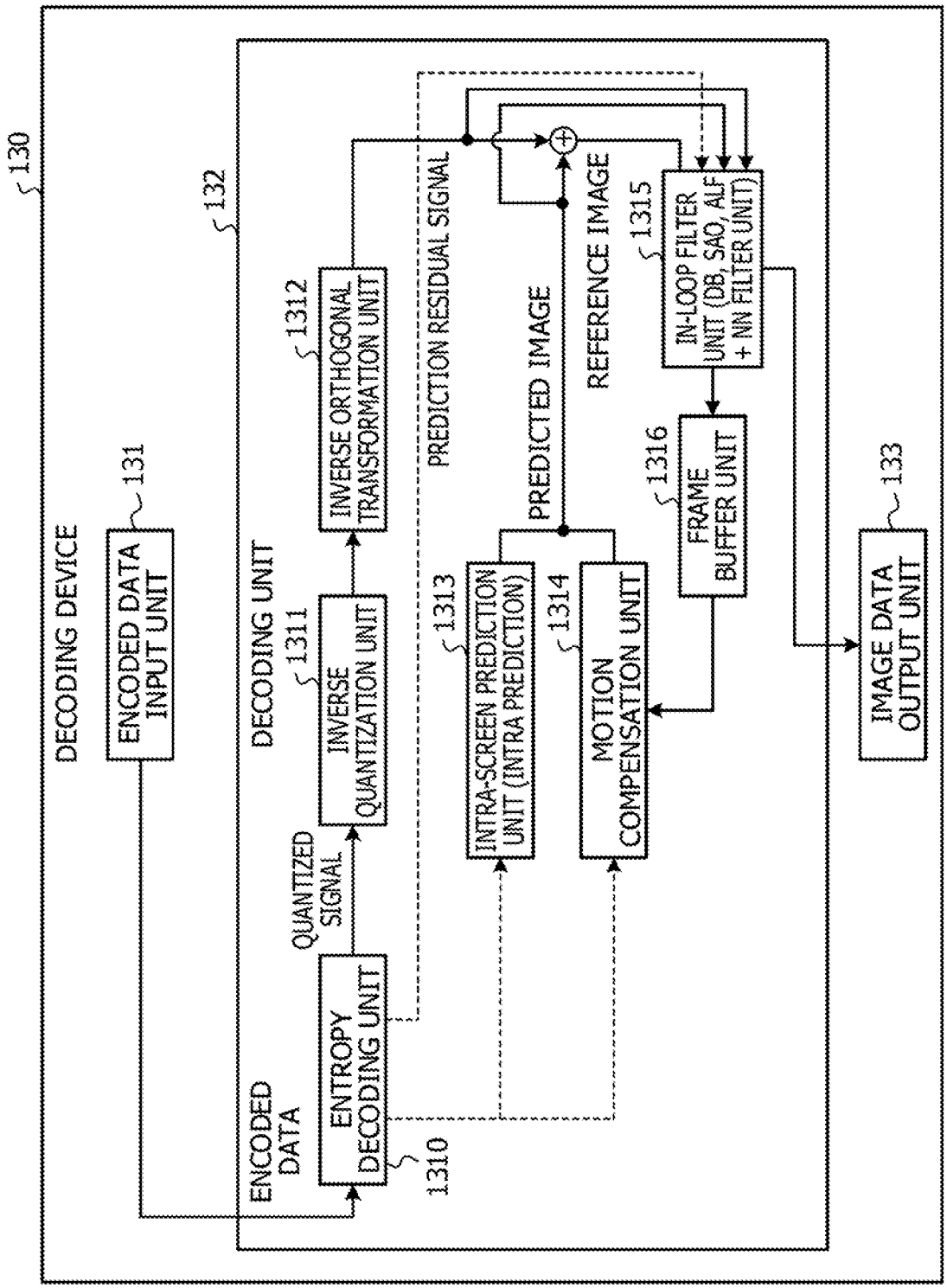
FIG. 13 is a diagram illustrating an example of a functional configuration of a decoding unit in the decoding device.

First, details of the functional configuration of the decoding unit 132 in the decoding device 130 will be described. FIG. 13 is a diagram illustrating an example of a functional configuration of a decoding unit in the decoding device.

As illustrated in FIG. 13, the decoding unit 132 in the decoding device 130 includes an entropy decoding unit 1310, an inverse quantization unit 1311, an inverse orthogonal transformation unit 1312, an intra-screen prediction unit 1313, a motion compensation unit 1314, and an addition unit 1301. The decoding unit 132 includes an in-loop filter unit 1315 and a frame buffer unit 1316.

The entropy decoding unit 1310 decodes the received encoded data and outputs a quantized signal. The entropy decoding unit 1310 extracts the quantization parameter and notifies the in-loop filter unit 1315. When the encoding device 120 transmits the encoded data, when the learned CNNF used for generating the encoded data has been transmitted, the entropy decoding unit 1310 acquires the learned CNNF and notifies the in-loop filter unit 1315.

The inverse quantization unit 1311 inversely quantizes the quantized signal and outputs the result to the inverse orthogonal transformation unit 1312. The inverse orthogonal transformation unit 1312 obtains a prediction residual signal by performing inverse orthogonal transformation processing on the inversely quantized signal.

The addition unit 1301 adds the prediction residual signal obtained by the inverse orthogonal transformation unit 1312, the predicted image generated by the intra-screen prediction unit 1313, or the predicted image motion-compensated by the motion compensation unit 1314 to output a reference image.

The in-loop filter unit 1315 performs filtering processing. The in-loop filter unit 1315 includes •a deblocking filter, •a sample adaptive offset filter, •an adaptive loop filter, and •an NN filter unit. The NN filter unit includes the learned CNNF notified from the learning device 110 (or the learned CNNF notified from the entropy decoding unit 1310 when transmitted by the encoding device 120).

In performing the filtering processing, the in-loop filter unit 1315 acquires a reference image generated by adding •the predicted image and the prediction residual signal, or acquires the prediction residual signal output from •inverse orthogonal transformation unit 1312, the predicted image generated by the intra-screen prediction unit 1313 or the motion compensation unit 1314, and the quantization parameter notified by the entropy decoding unit 1310, respectively.

The in-loop filter unit 1315 outputs the filtered reference image as a decoded image and stores the reference image in the frame buffer unit 1316.

The intra-screen prediction unit 1313 performs intra-screen prediction for generating a predicted image by using the filtered reference image. The motion compensation unit 1314 performs motion compensation for generating a predicted image based on each frame of the filtered reference image.

When the predicted image generated by the intra-screen prediction of the intra-screen prediction unit 1313 or the predicted image generated by the motion compensation of the motion compensation unit 1314 is output, the addition unit 1301 adds the output predicted image and the prediction residual signal output by the inverse orthogonal transformation unit 1312.

Figure 14:
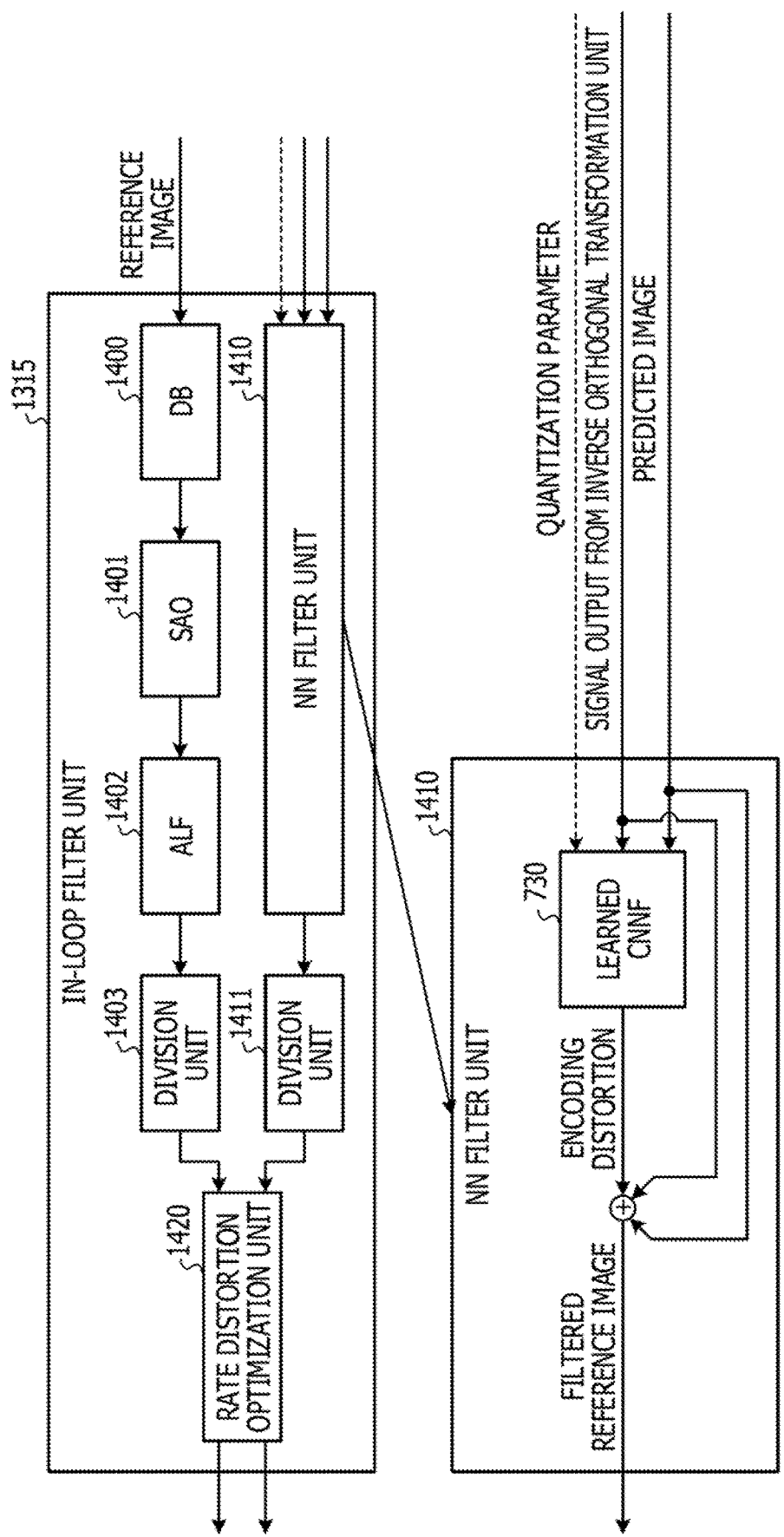
FIG. 14 is a diagram illustrating an example of a functional configuration of the in-loop filter unit and a functional configuration of the NN filter unit in the decoding device.

(2) Functional Configuration of In-Loop Filter Unit and Functional Configuration of NN Filter Unit in Decoding Device Next, details of the functional configuration of the in-loop filter unit 1315 and the functional configuration of the NN filter unit in the decoding device 130 will be described. FIG. 14 is a diagram illustrating an example of a functional configuration of the in-loop filter unit and a functional configuration of the NN filter unit in the decoding device.

As illustrated in FIG. 14, the in-loop filter unit 1315 includes a DB 1400, a SAO 1401, an ALF 1402, a division unit 1403, an NN filter unit 1410 which is an example of first and second acquisition units, a division unit 1411, and a rate distortion optimization unit 1420.

The function of each unit included in the in-loop filter unit 1315 is the same as the function of each unit included in the in-loop filter unit 600 described with reference to FIG. 7, and a description thereof will not be repeated.

(3) Flow of Filtering Processing by NN Filter Unit in Decoding Device

Figure 15:
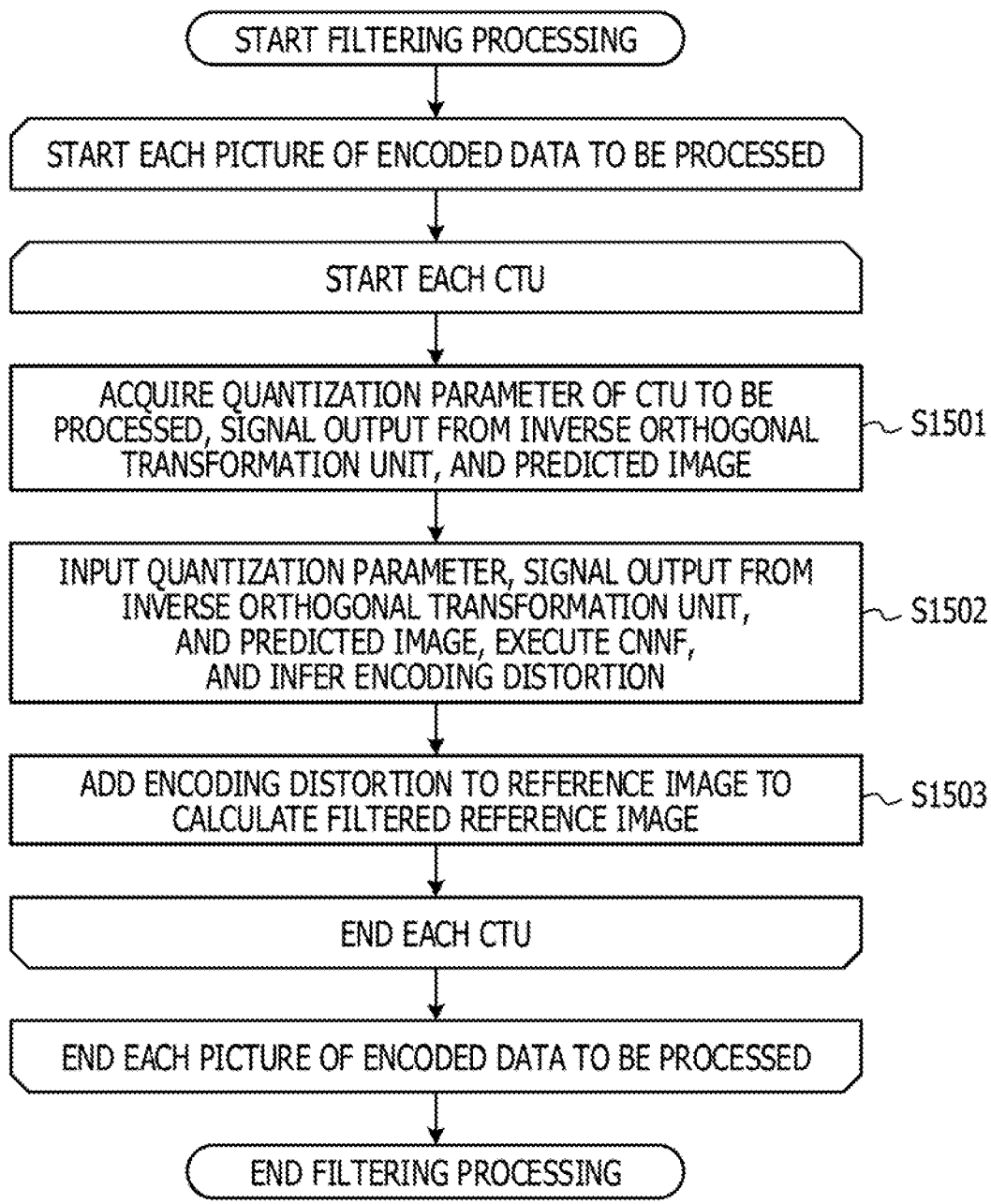
FIG. 15 is a flowchart illustrating a flow of filtering processing by the NN filter unit in the decoding device.

Next, a flow of the filtering processing by the NN filter unit 1410 in the decoding device 130 will be described. FIG. 15 is a flowchart illustrating a flow of filtering processing by the NN filter unit in the decoding device.

The processing from step S1501 to step S1503 is executed for each picture (each frame) of the encoded data to be processed and each CTU (each processing unit).

In step S1501, the NN filter unit 1410 acquires a quantization parameter of a CTU to be processed, a signal output from the inverse orthogonal transformation unit 1312, and a predicted image.

In step S1502, the NN filter unit 1410 executes the learned CNNF 730 by dividing and inputting the quantization parameter, the signal output from the inverse orthogonal transformation unit 1312, and the predicted image to the learned CNNF 730. The NN filter unit 1410 acquires the encoding distortion inferred by the learned CNNF 730.

In step S1503, the NN filter unit 1410 calculates the filtered reference image by adding the obtained encoding distortion to the reference image.

When the processing from step S1501 to step S1503 is completed for all pictures (frames) included in the encoded data to be processed and all CTUs (processing units), the NN filter unit 1410 ends the filtering processing.

As is clear from the above description, the learning device according to the present embodiment performs encoding processing on an input image for learning by using an encoding unit provided with an existing in-loop filter unit and stores data output from each unit of the encoding unit as learning data. When learning the encoding distortion by using the learning data, the learning device according to the present embodiment separately inputs the signal including the quantization error and the image including the prediction error to the CNNF.

Thus, according to the learning device of the present embodiment, it is possible to divide the quantization error and the prediction error, and to learn the encoding distortion. As a result, according to the learning device of the present embodiment, it is possible to avoid a situation in which the learning processing does not converge when learning the encoding distortion.

The encoding device according to the present embodiment includes an NN filter unit including a learned CNNF generated by performing learning processing by the learning device and acquires an encoding distortion inferred by separately inputting a signal including a quantization error and an image including a prediction error.

Thus, according to the encoding device according to the present embodiment, the encoding distortion may be inferred with high inference accuracy, and filter performance may be improved.

The decoding device according to the present embodiment includes an NN filter unit including a learned CNNF generated by performing learning processing by the learning device and acquires an encoding distortion inferred by separately inputting a signal including a quantization error and an image including a prediction error.

Thus, according to the decoding device according to the present embodiment, an encoding distortion may be inferred with high inference accuracy, and filter performance may be improved.

As described above, according to the present embodiment, the filter performance of the in-loop filter unit may be improved.

The present disclosure is not limited to the configurations illustrated herein while the configurations exemplified according to the aforementioned embodiments may also be combined with other elements, for example. These aspects may be changed without departing from the gist of the present disclosure and appropriately set in accordance with applied modes thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a processor included in a computer to execute a process, the process comprising:
   encoding an input image to be processed by calculating a prediction residual from a difference between a predicted image generated by intra-screen prediction or inter-screen prediction and the input image to be processed and performing orthogonal transformation processing and quantization processing on the calculated prediction residual, and then performing entropy encoding processing;
   acquiring a quantization parameter used in the quantization processing, a quantization error occurring in the quantization processing, and a prediction error occurring in the intra-screen prediction or the inter-screen prediction when encoding the input image to be processed;
   acquiring an encoding distortion inferred by a loop filter processing which comprises a learned convolutional neural network filter by separately inputting the acquired quantization parameter, the quantization error, and the prediction error to the loop filter processing that has learned an encoding distortion generated when encoding an input image for learning; and
   generating a filtered reference image by adding the encoding distortion inferred by the learned convolutional neural network filter to a sum of the predicted image and an inversely quantized and inversely transformed prediction error,
   the encoding distortion indicates a difference between the reference image and the input image,
   the learned convolutional neural network filter is trained by using:
      a predicted image generated by intra-screen prediction or inter-screen prediction,
      a quantization parameter used when performing orthogonal transformation processing and quantization processing on a prediction residual calculated from a difference between the predicted image and the input image for learning,
      a signal obtained by performing inverse quantization processing and inverse orthogonal transformation processing on a result of the quantization processing, and
      the input image for learning.

2. The non-transitory computer-readable storage medium according to claim 1, wherein the quantization error occurring in the quantization processing is a signal obtained by performing inverse quantization processing and inverse orthogonal transformation processing on a result of the quantization processing.

3. The non-transitory computer-readable storage medium according to claim 2, wherein the process further comprising:
   generating a reference image by adding the signal obtained by performing the inverse orthogonal transformation processing and the predicted image; and
   outputting a first filtered reference image by adding the encoding distortion inferred by separately inputting the acquired quantization parameter, the signal obtained by performing the inverse orthogonal transformation processing, and the predicted image to the generated reference image, to the filter unit.

4. The non-transitory computer-readable storage medium according to claim 3, wherein the process further comprising:
   outputting a second filtered reference image by inputting the generated reference image to another loop filter processing, the another loop filter processing being a loop filter and comprising a deblocking filter, a sample adaptive offset filter and an adaptive loop filter; and
   outputting one of a smaller rate distortion out of the first filtered reference image and the second filtered reference image as a final filtered reference image.

5. The non-transitory computer-readable storage medium according to claim 4, wherein the loop filter processing is generated by learning by using learning data obtained when encoding the input image for learning.

6. A non-transitory computer-readable storage medium storing a program that causes a processor included in a computer to execute a process, the process comprising:
   decoding encoded data by adding a signal obtained by performing inverse quantization processing and inverse orthogonal transformation processing to a predicted image obtained by performing intra-screen prediction or motion compensation and performing filtering processing on a quantized signal obtained by performing entropy decoding on the encoded data;
   acquiring a quantization parameter used in the quantization processing, a quantization error occurring in the quantization processing, and a prediction error occurring in the intra-screen prediction or the inter-screen prediction when encoding the input image to be processed;

acquiring an encoding distortion inferred by a loop filter processing which comprises a learned convolutional neural network filter by separately inputting the acquired quantization parameter, the quantization error, and the prediction error to the loop filter processing that has learned an encoding distortion generated when encoding an input image for learning; and generating a filtered reference image by adding the encoding distortion inferred by the learned convolutional neural network filter to a sum of the predicted image and an inversely quantized and inversely transformed prediction error, the encoding distortion indicates a difference between the reference image and the input image, the learned convolutional neural network filter is trained by using:
 a predicted image generated by intra-screen prediction or inter-screen prediction,
 a quantization parameter used when performing orthogonal transformation processing and quantization processing on a prediction residual calculated from a difference between the predicted image and the input image for learning,
 a signal obtained by performing inverse quantization processing and inverse orthogonal transformation processing on a result of the quantization processing, and
 the input image for learning.

7. The non-transitory computer-readable storage medium according to claim 6, wherein the quantization error is a signal obtained by performing inverse quantization processing and inverse orthogonal transformation processing on the quantized signal.

8. The non-transitory computer-readable storage medium according to claim 7, wherein the process further comprising:
 generating a reference image by adding the signal obtained by performing the inverse orthogonal transformation processing and the predicted image; and
 outputting a first filtered reference image by adding the encoding distortion inferred by separately inputting the acquired quantization parameter, the signal obtained by performing the inverse orthogonal transformation processing, and the predicted image to the generated reference image, to the filter unit to decode the encoded data.

9. The non-transitory computer-readable storage medium according to claim 8, wherein the loop filter processing is generated by learning by using learning data obtained when encoding the input image for learning.

10. An encoding method for encoding an input image to be processed by calculating a prediction residual from a difference between a predicted image generated by intra-screen prediction or inter-screen prediction and the input image to be processed and performing orthogonal transformation processing and quantization processing on the calculated prediction residual, and then performing entropy encoding processing, the method comprising:
 acquiring a quantization parameter used in the quantization processing, a quantization error occurring in the quantization processing, and a prediction error occurring in the intra-screen prediction or the inter-screen prediction when encoding the input image to be processed;

acquiring an encoding distortion inferred by a loop filter processing which comprises a learned convolutional neural network filter by separately inputting the acquired quantization parameter, the quantization error, and the prediction error to the loop filter processing that has learned an encoding distortion generated when encoding an input image for learning; and generating a filtered reference image by adding the encoding distortion inferred by the learned convolutional neural network filter to a sum of the predicted image and an inversely quantized and inversely transformed prediction error, the encoding distortion indicates a difference between the reference image and the input image, the learned convolutional neural network filter is trained by using:
 a predicted image generated by intra-screen prediction or inter-screen prediction,
 a quantization parameter used when performing orthogonal transformation processing and quantization processing on a prediction residual calculated from a difference between the predicted image and the input image for learning,
 a signal obtained by performing inverse quantization processing and inverse orthogonal transformation processing on a result of the quantization processing, and
 the input image for learning.

11. A decoding method for decoding encoded data by adding a signal obtained by performing inverse quantization processing and inverse orthogonal transformation processing to a predicted image obtained by performing intra-screen prediction or motion compensation and performing filtering processing on a quantized signal obtained by performing entropy decoding on the encoded data, the method comprising:
 acquiring a quantization parameter used in the quantization processing, a quantization error occurring in the quantization processing, and a prediction error occurring in the intra-screen prediction or the inter-screen prediction when encoding the input image to be processed;

acquiring an encoding distortion inferred by a loop filter processing which comprises a learned convolutional neural network filter by separately inputting the acquired quantization parameter, the quantization error, and the prediction error to the loop filter processing that has learned an encoding distortion generated when encoding an input image for learning; and generating a filtered reference image by adding the encoding distortion inferred by the learned convolutional neural network filter to a sum of the predicted image and an inversely quantized and inversely transformed prediction error, the encoding distortion indicates a difference between the reference image and the input image, the learned convolutional neural network filter is trained by using:
 a predicted image generated by intra-screen prediction or inter-screen prediction,
 a quantization parameter used when performing orthogonal transformation processing and quantization processing on a prediction residual calculated from a difference between the predicted image and the input image for learning, a signal obtained by performing inverse quantization processing and inverse orthogonal transformation processing on a result of the quantization processing, and the input image for learning.

12. A encoding device, comprising:

a memory; and a processor coupled to the memory and the processor configured to:

encode an input image to be processed by calculating a prediction residual from a difference between a predicted image generated by intra-screen prediction or inter-screen prediction and the input image to be processed and performing orthogonal transformation processing and quantization processing on the calculated prediction residual, and then performing entropy encoding processing, acquire a quantization parameter used in the quantization processing, a quantization error occurring in the quantization processing, and a prediction error occurring in the intra-screen prediction or the inter-screen prediction when encoding the input image to be processed, acquire an encoding distortion inferred by a loop filter processing which comprises a learned convolutional neural network filter by separately inputting the acquired quantization parameter, the quantization error, and the prediction error to the loop filter processing that has learned an encoding distortion generated when encoding an input image for learning, and generate a filtered reference image by adding the encoding distortion inferred by the learned convolutional neural network filter to a sum of the predicted image and an inversely quantized and inversely transformed prediction error, the encoding distortion indicates a difference between the reference image and the input image, the learned convolutional neural network filter is trained by using:

a predicted image generated by intra-screen prediction or inter-screen prediction, a quantization parameter used when performing orthogonal transformation processing and quantization processing on a prediction residual calculated from a difference between the predicted image and the input image for learning, a signal obtained by performing inverse quantization processing and inverse orthogonal transformation processing on a result of the quantization processing, and the input image for learning.

13. A decoding device, comprising:

a memory; and a processor coupled to the memory and the processor configured to:

decode encoded data by adding a signal obtained by performing inverse quantization processing and inverse orthogonal transformation processing to a predicted image obtained by performing intra-screen prediction or motion compensation and performing filtering processing on a quantized signal obtained by performing entropy decoding on the encoded data, acquire a quantization parameter used in the quantization processing, a quantization error occurring in the quantization processing, and a prediction error occurring in the intra-screen prediction or the inter-screen prediction when encoding the input image to be processed;

acquire an encoding distortion inferred by a loop filter processing which comprises a learned convolutional neural network filter by separately inputting the acquired quantization parameter, the quantization error, and the prediction error to the loop filter processing that has learned an encoding distortion generated when encoding an input image for learning, and generate a filtered reference image by adding the encoding distortion inferred by the learned convolutional neural network filter to a sum of the predicted image and an inversely quantized and inversely transformed prediction error, the encoding distortion indicates a difference between the reference image and the input image, the learned convolutional neural network filter is trained by using:

a predicted image generated by intra-screen prediction or inter-screen prediction, a quantization parameter used when performing orthogonal transformation processing and quantization processing on a prediction residual calculated from a difference between the predicted image and the input image for learning, a signal obtained by performing inverse quantization processing and inverse orthogonal transformation processing on a result of the quantization processing, and the input image for learning.

* * * * *